July 11, 1972 R. WIMMER Re. 27,430

PLUMBING FIXTURE AND METHOD OF MANUFACTURING THE SAME

Original Filed Sept. 2, 1964

United States Patent Office

Re. 27,430
Reissued July 11, 1972

27,430

PLUMBING FIXTURE AND METHOD OF MANUFACTURING THE SAME

Robert Wimmer, Linzer-Strasse 246,
A4600 Wels, Austria

Original No. 3,356,253, dated Dec. 5, 1967, Ser. No. 393,926, Sept. 2, 1964. Application for reissue Aug. 7, 1970, Ser. No. 62,095
Claims priority, application Austria, Sept. 6, 1963, A 7,179/63
Int. Cl. B65d *25/14*
U.S. Cl. 220—64 13 Claims

Matter enclosed in heavy brackets [ ] appears in the original patent but forms no part of this reissue specification; matter printed in italics indicates the additions made by reissue.

ABSTRACT OF THE DISCLOSURE

A bath tub or similar plumbing fixture consisting of a polymethacrylate liner and an outer coating of glass-fiber reinforced cured polyester resin is produced by deep drawing polymethacrylate sheeting into the shape of the liner, spraying a coating of polyester resin on the outer surface of the deep-drawn body, embedding glass fiber fabric in the sprayed coating, and curing the coating.

This invention relates to plastic plumbing fixtures and to a process of manufacturing the same.

Wash-basins, bath-tubs, shower trays and similar plumbing fixtures are made in most cases of sheet metal, which may be enamelled. It is also known to make bath-tubs and the like from polyester resin, which is reinforced with glass fibers. The tubs or tublike articles were manufactured theretofore by applying one or more layers of the unsaturated polyester resin, and glass fiber material to a male mold, and curing the applied material. Because a certain minimum time is required for curing and the structure cannot be removed from the mold before it is cured, the process takes a relatively long time, and many molds must be available when a higher production rate is desired.

It is an object of the invention to accelerate the manufacture of wash-basins, bath-tubs, shower trays or the like from plastics and consequently to reduce their cost.

The process according to the invention resides in suitably shaping a hollow body from sheeting of thermoplastic synthetic material, such as polymethacrylate, preferably by vacuum deep-drawing, and coating the outer surface of the hollow body in a known manner with a thermosetting synthetic material, preferably an unsaturated polyester resin reinforced with glass fibers. The hollow bodies can be made in a quick and simple manner by deep drawing. A thermoplastic hollow body, however, is not suitable for use as a plumbing fixture because wash-basins and the like must withstand elevated temperatures. The subsequently applied outer coating of polyester or other thermosetting resin when cured provides strong support at elevated temperature to the thermoplastic synthetic body or liner which replaces the previously required molds. Hence, the liners ejected in short intervals from the vacuum deep-drawing apparatus can be coated in continuous operation with the thermosetting plastic and can then be stored and allowed to cure without delaying manufacture.

The tublike hollow liner deep-drawn from synthetic thermoplastic material is spray-coated with a fluid polyester resin composition. Then a woven fabric of glass fibers is applied to the coating under pressure and sprayed with another layer of polyester resin. Air entrapped between the coating and the glass fabric is squeezed out by means of rollers.

An embodiment of the invention is shown in the accompanying drawings, in which

Figure 1:
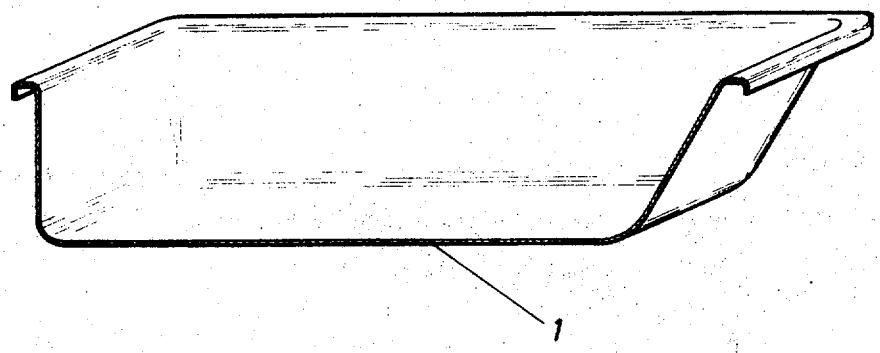
Figure 2:
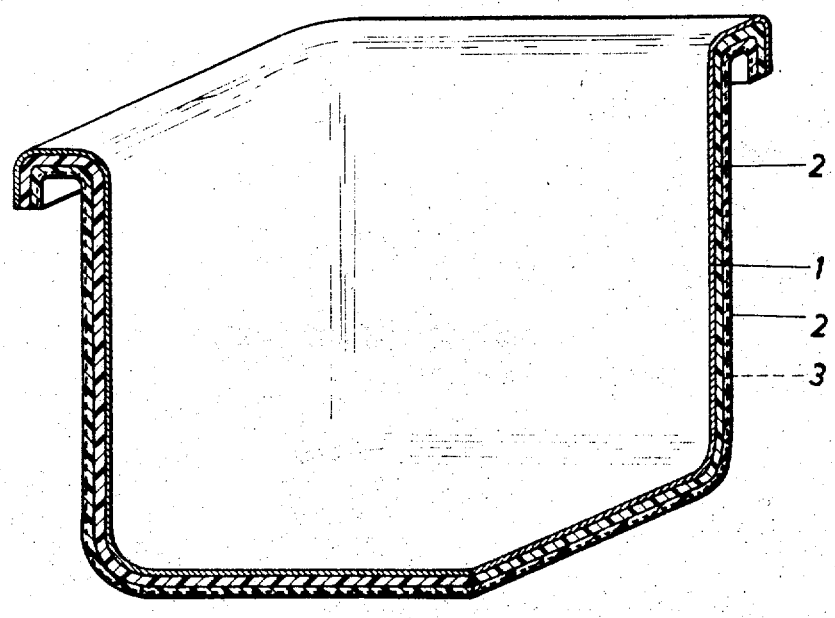

FIG. 1 is a perspective longitudinal sectional view of a base layer for a bath-tub, FIG. 2 is a view similar to FIG. 1 of the finished bath-tub.

The exposed inner or lining layer 1 shown in FIG. 1 is shaped in the form of a bath-tub by vacuum deep drawing from polymethacrylate sheeting. After being removed from the vacuum deep drawing apparatus, it is spray-coated with two outer layers 2 of thermosetting polyester resin. A glass fiber fabric 3 is applied to the thermosetting material while the same is still soft and is pressed into the plastics material until it is embedded in it.

The invention is not restricted to the above-mentioned synthetic thermoplastics and thermosetting materials but any combination of synthetic thermoplastic material and thermosetting plastics which are capable of being bonded to each other may be used.

I claim:

1. A plumbing fixture, *capable of withstanding elevated temperatures during use,* defining an open-topped cavity comprising:
   (a) an inner layer of *acrylic* synthetic thermoplastic resin material substantially coextensive with and exposed in said cavity; and
   (b) a *spray*-coating essentially consisting of a cured thermosetting *polyester* plastic and glass fibers embedded in said plastic,
      (1) said coating covering said inner layer and being bonded thereto; *and*
      (2) *said coating providing support to said inner layer sufficient to retain, at elevated temperatures, the strength of said plumbing fixture and the ability of said plumbing fixture to withstand deformation.*

[2. A plumbing fixture as set forth in claim 1, which is in the form of a wash-basin.]

[3. A plumbing fixture as set forth in claim 1, which is in the form of a bath-tub.]

[4. A plumbing fixture as set forth in claim 1, which is in the form of a shower tray.]

5. A plumbing fixture as set forth in claim 1, in which said synthetic thermoplastic material essentially consists of polymethacrylic ester.

[6. A plumbing fixture as set forth in claim 1, in which said thermosetting plastic is an unsaturated polyester.]

7. A plumbing fixture as set forth in claim 1, in which said coating comprises a plurality of layers of said thermosetting plastic, said fibers being embedded in one of said layers, and the other layer being substantially free of said fibers.

8. A process of manufacturing a plumbing fixture *that is capable of withstanding elevated temperatures during use,* which comprises:
   (a) shaping *acrylic* synthetic thermoplastic sheeting into a hollow body defining an open-topped cavity therein;
   (b) [applying to] *spray-coating* the outer surface of said body *with* a fluid coating composition including a thermosetting *polyester* plastic;
   (c) embedding reinforcing glass fibers in said coating; and
   (d) curing said coating *to provide support to said body sufficient to retain, at elevated temperatures, the strength of said plumbing fixture and the ability of said plumbing fixture to withstand deformation.*

9. A process as set forth in claim 8, in which said sheeting is shaped by vacuum deep drawing.

10. A process as set forth in claim 8, in which said eeting essentially consists of polymethacrylate.

[11. A process as set forth in claim 8, in which said ermosetting plastic essentially consists of unsaturated lyester.]

12. A process as set forth in claim 8, in which said coat- g is applied in a plurality of layers.

13. A process of manufacturing a shaped article from astic, which comprises vacuum-forming *acrylic* syn- etic thermoplastic sheeting to form a self-supporting dy defining an open-topped cavity therein, spraying ermosetting *polyester* plastic material on the outer sur- ce of said body to form a coating thereon, embedding nforcing glass fibers in said coating, and curing said ermosetting plastic material.

*14. A process as set forth in claim 13, in which said nthetic thermoplastic sheeting is polymethacrylate.*

*15. A plumbing fixture, capable of withstanding ele- ed temperatures during use, defining an open-topped ity comprising:*

*(a) a self-supporting vacuum deep-drawn inner layer of polymethacrylate synthetic thermoplastic resin sheeting substantially coextensive with and exposed in said cavity; and*

*(b) a spray-coating essentially consisting of a cured thermosetting unsaturated polyester plastic and glass fibers embedded in said plastic,*

*(1) said coating covering said inner layer and being bonded thereto; and*

*(2) said coating providing support to said inner layer sufficient to retain, at elevated temperatures, the strength of said plumbing fixture and the ability of said plumbing fixture to withstand deformation.*

*16. A process of manufacturing a plumbing fixture that capable of withstanding elevated temperatures during , which comprises:*

*(a) vacuum deep drawing polymethacrylate synthetic thermoplastic sheeting into a self-supporting hollow body defining an open-topped cavity therein;*

*(b) removing the body from the means for vacuum deep drawing;*

*(c) spray-coating the outer surface of said body with a fluid coating composition including a thermosetting unsaturated polyester plastic;*

*(d) embedding reinforcing glass fibers in said coating; and*

*(e) curing said coating to provide support to said body sufficient to retain, at elevated temperatures, the strength of said plumbing fixture and the ability of said plumbing fixture to withstand deformation, said hollow body being self-supporting during curing.*

*17. A process of manufacturing a shaped article from plastic, which comprises vacuum-forming acrylic synthetic thermoplastic sheeting to form a self-supporting body defining an open-topped cavity therein, removing the self-supporting body from the vacuum forming means, spraying thermosetting unsaturated polyester plastic material on the outer surface of said body to form a coating thereon, embedding reinforcing glass fibers in said coating, and curing said thermosetting unsaturated polyester plastic material whereby the reinforced coating is bonded to the self-supporting body, said body being self-supporting during curing.*

*18. An accelerated process of manufacturing shaped articles from plastic, which comprises:*

*(a) in a quick manner shaping by vacuum-forming means acrylic synthetic thermoplastic sheeting to form a self-supporting body defining an open-topped cavity therein; and*

*(b) in a continuous operation so as not to delay manufacture, removing the body from the vacuum-forming means to allow a higher production rate therefrom; thereafter spraying thermosetting unsaturated polyester plastic material on the outer surface of said body to form a coating thereon; embedding reinforcing glass fibers in said coating; and curing said reinforced coating while the body is being stored and self-supporting.*

References Cited

The following references, cited by the Examiner, are of record in the patented file of this patent or the original patent.

UNITED STATES PATENTS

| | | | |
|---|---|---|---|
| 2,590,221 | 3/1952 | Stevens | 156—196 |
| 2,695,256 | 11/1954 | De Olloqui et al. | 161—165 |

JAMES B. MARBERT, Primary Examiner

U.S. Cl. X.R.

220—83